United States Patent [19] [11] 4,381,097
Moraca [45] Apr. 26, 1983

[54] APPARATUS FOR AND METHOD OF SUSPENDING A LOAD

[76] Inventor: Daniel A. Moraca, 2020 N. 32 St. Apt. 209, Phoenix, Ariz. 85008

[21] Appl. No.: 226,003

[22] Filed: Jan. 19, 1981

[51] Int. Cl.³ .......................................... F16M 13/00
[52] U.S. Cl. .................................. 248/546; 411/340; 248/493
[58] Field of Search ................. 248/546, 216.1, 217.1, 248/497, 498, 493, 345; 411/340, 344, 345, 346; 24/116 A

[56] References Cited

U.S. PATENT DOCUMENTS

| 1,370,319 | 3/1921 | Kennedy | 411/341 |
| 1,943,174 | 1/1934 | Gagnon | 24/116 A |
| 2,744,437 | 5/1956 | Murphy | 248/216.1 X |
| 3,143,915 | 8/1964 | Tendler | 248/216.4 X |
| 4,196,883 | 4/1980 | Einhorn | 248/546 |

Primary Examiner—Francis K. Zugel
Assistant Examiner—Sarah A. Lechok
Attorney, Agent, or Firm—Harry M. Weiss

[57] ABSTRACT

This disclosure relates to an apparatus for suspending a load from a wall, which apparatus incorporates a rigid rod which can be driven through a wall, a convoluted cord wouplce to the rigid rod, and a hook device having a slot which can be forked about the convoluted cord trailing through the wall to thereby compress the wall between the rod and the hook, so that a load can then be supported from the hook.

12 Claims, 7 Drawing Figures

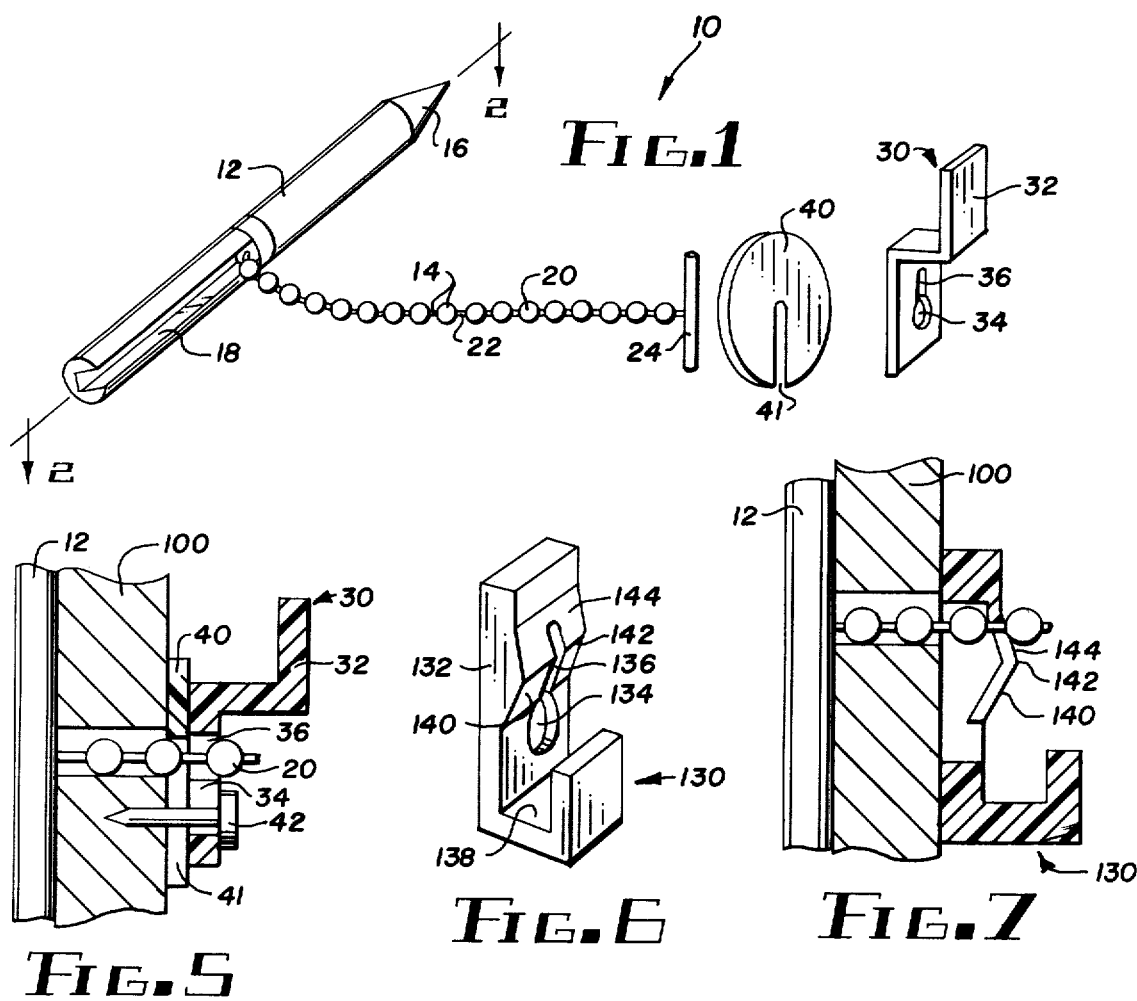
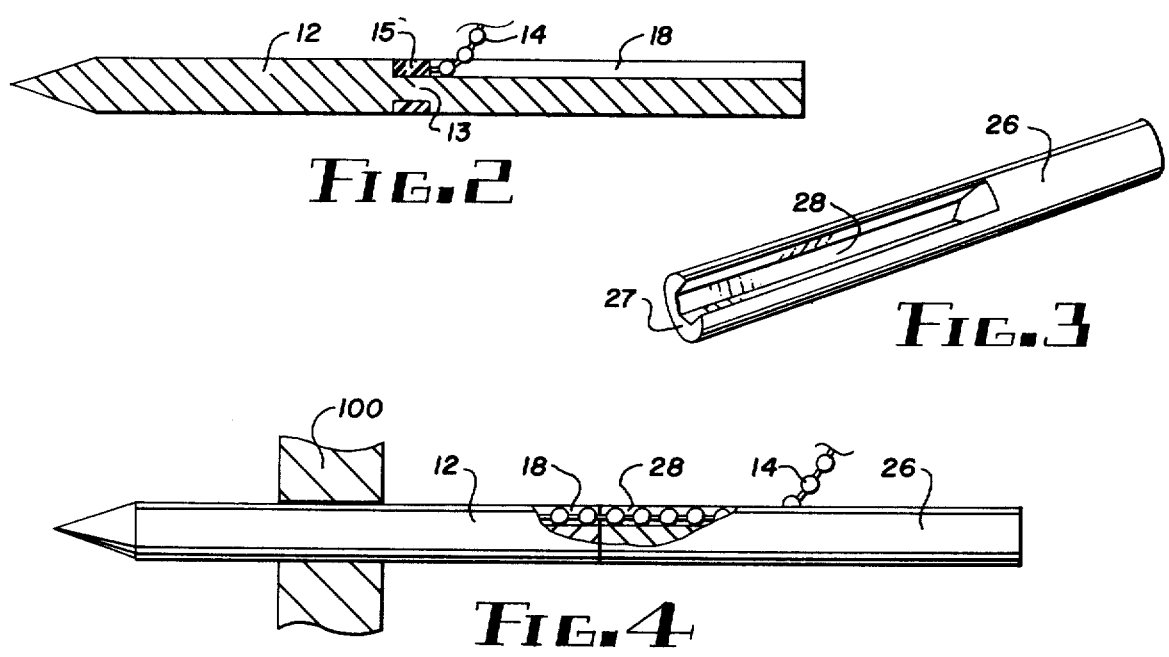

APPARATUS FOR AND METHOD OF SUSPENDING A LOAD

BACKGROUND OF THE INVENTION

1. Field of the Invention

This invention relates generally to support devices, and, more specifically, to a wall hanger type support device which can be used to support a load from a surface of a wall.

2. Description of the Prior Art

In the past, it has often been desired to hang various articles from the walls of a structure. Typical examples of such articles included works of art, clocks and mirrors. Walls have often been fabricated from materials in which the allowable unit stress was relatively low. Examples include: gypsum board or drywall; plaster applied over lath; etc. Support from such walls was commonly provided by simply driving a nail into the wall. The load was then directly suspended from the nail. However, a substantial problem was presented in that the low allowable unit stress limited the load which could be suspended without having the wall yield locally under the load transferred by the nail. A need existed for a wall hanger which could support a substantial load without causing a failure of the wall surface material and a without resulting in a pull-out of the hanger.

Other devices such as toggle bolts were also developed to support a load from a wall. However, toggle bolts required that a hole be pre-drilled to permit insertion of the toggle and a portion of the bolt through the wall. Toggle bolts also typically required a substantial clearance behind the intended mounting location, to permit the mounting screw to fully engage the toggle against the wall. Additionally, the normal overlength of the bolt of the toggle bolt assembly dictated that substantial time be expended to fully assemble the device by screwing the parts together. Furthermore, the toggle was typically of such limited span that substantial stress concentrations commonly occurred when the toggle contacted the wall, causing an altogether too frequent pull-out of the assembly from the wall. A need continued to exist for a device to suspend a load from a wall, which device did not require a pre-drilled hole for installation, did not require an extensive clearance behind the wall to permit installation, did not require time consuming hand-threading for installation, and which also distributed the applied load over a substantial portion of the wall to reduce unit stresses in the wall.

Typically, an unobscured wall attachment apparatus has remained a visual impairment on a wall. A need existed for a wall attachment apparatus which was not visually obvious.

BRIEF DESCRIPTION OF THE DRAWING

FIG. 1 is a perspective view of the inventive wall attachment apparatus.

FIG. 2 is a sectional view taken along line 2—2 of FIG. 1.

FIG. 3 is a perspective view of the driver tool for the inventive wall attachment apparatus.

FIG. 4 is a partially sectional view of the wall attachment apparatus being driven through a wall.

FIG. 5 is a sectional view of the wall attachment apparatus of FIG. 1 fully installed.

FIG. 6 is a perspective view of an alternate embodiment of the hook of the wall attachment apparatus.

FIG. 7 is a view similar to FIG. 5 showing the hook of FIG. 1 connected on one side of a wall by means of the inventive attachment apparatus of this invention.

SUMMARY OF THE INVENTION

In accordance with one embodiment of this invention, it is an object to provide a wall attachment apparatus to permit a load to be suspended from a wall.

It is another object to provide a wall attachment apparatus which can spread the applied load over a substantial portion of the wall.

It is a further object to provide a wall attachment apparatus which does not require a pre-drilled hole for installation.

It is again another object to provide a wall attachment apparatus which may be quickly installed.

It is still a further object to provide a wall attachment apparatus which does not require threading for installation.

It is an object to provide a wall attachment apparatus which is not visually obvious when installed but unobscured.

DESCRIPTION OF THE PREFERRED EMBODIMENTS

In accordance with one embodiment of this invention, a wall attachment apparatus is disclosed, comprising: backing means having an elongated rod member for contacting a first face of the wall, hook means for contacting a second face of the wall and further for permitting support of a load; tension means for biasing the wall between the backing means and the hook means; and the tension means comprising a convoluted cord member.

In accordance with another embodiment of this invention, a method of suspending a load from a wall is disclosed, comprising the steps of: coupling a periodically convoluted cord to a rod; driving the rod completely through the wall; tensioning the cord to load the rod against the wall; forking a convolution of the convoluted cord with a slotted hook; and engaging the load upon the hook.

The foregoing and other objects, features and advantages will be apparent from the following, more particular, description of the preferred embodiments of the invention, as illustrated in the accompanying drawings.

Referring to FIG. 1, an exploded view of a wall attachment apparatus is shown generally by reference number 10. The attachment apparatus 10 is provided with a rod 12 pivotally coupled to a cord 14. A pointed end 16 permits the rod 12 to be driven through a wall. The rod 12 also has a channel 18 formed therein to allow the cord 14 to lie within the profile of the rod 12, to prevent a shearing of the cord 14 from the rod 12 as the rod 12 is driven through a wall (Refer also to FIG. 4).

The cord 14 has a series of equally spaced convolutions, which in the embodiment shown are comprised of a number of spheres 20 connected by links 22. The cord 14 is advantageously fabricated from nylon, to provide resiliency. The convolutions of the cord 14 can be formed by simply tying periodic knots, or by molding the cord material into the appropriately convoluted shape.

A handle 24 is attached to the second end of the cord 14, and permits the cord 14 to be readily manually tensioned, as hereafter explained. The attachment apparatus 10 is further provided with a hook apparatus, a first embodiment of which is shown generally by reference number 30. The embodiment of the hook 30 shown in FIG. 1 has a body 32, in which is formed an aperture 34. The aperture 34 is large enough to permit serial passage of the spheres 20. Also formed in the body 32 is a slot 36, which is open to the aperture 34. The slot 36 is large enough to pass over, or fork, one of the link members 22, but small enough to prevent passage of one of the sphere members 20 therethrough. A washer 40 is provided to permit the body 32 to be shimmed from the wall upon which the attachment apparatus 10 is installed. A nail 42 is also provided to permit the attachment apparatus 10 to be secured in place on the wall.

Referring to FIG. 2, a sectional view taken along line 2—2 of FIG. 1 is shown, illustrating the coupling of the cord 14 to the rod 12. The rod 12 is provided with a shank 13 which is of smaller diameter than the remainder of the rod 12. The cord 14 has an anchor ring 15 molded or tied about the shank 13. The outer diameter of the anchor ring 15 is no greater than the greatest diameter of the rod 12, to allow unimpeded passage through a wall.

Although the attachment apparatus 10 as shown in FIG. 1 can be readily placed in an existing hole in a wall, the preferred embodiment of the apparatus 10 also includes a driver rod 26, as shown in perspective in FIG. 3. The driver rod 26 is an elongated member which can be used to allow a hammer, or other impacting device, to drive the rod 12 fully through a wall. The driver rod 26 is provided with opposed, parallel ends. A first end 27 is arranged to be placed against the unpointed end of the rod 12, to permit impacts delivered to the other end of the driver rod 26 to be transmitted to the rod 12. The first end 27 of the driver rod 26 also defines the terminus of a groove 28 which continues through a portion of the length of the driver rod 26.

Referring to FIG. 4, the attachment apparatus 10 is shown being driven through a wall 100 by a driver rod 26. The cord 14 fits flatly within the channel 18, and within the groove 28, to permit passage through the opening formed as the pointed end of the rod 12 is driven through the wall 100. The channel 18 and the groove 28 in combination allow the cord 14 to lie within the profile of the rod 12, even as the rod 12 is driven completely through the wall 100, preventing a shearing of the cord 14 from the rod 12. It will be apparent to one skilled in the art that the rod 12 could be driven into the wall 100 at an angle from the plane of the wall 100. The angular insertion permits a very long rod 12 to be installed even where the clearance behind the wall 100 is limited. The long rod 12, in turn, provides a wide distribution of the load applied to the hook 30, reducing the liklihood that the attachment apparatus 10 will be pulled from the wall 100 under load.

Referring further to FIG. 5, a sectional view of the attachment apparatus 10 is shown, fully installed upon the wall 100. The rod 12 acts as a backing member, and contacts the backside, or internal face, of the wall 100. The hook apparatus 30 provides the structure to support a load, and is shown with the body 32 formed as a simple hook, as would permit a wire supporting a frame to be saddled therein. The body 32 is positioned about the cord 14 such that the slot 36 is disposed about one of the links 22, and one of the spheres 20 bears against the edge formed by the juncture of the slot 36 and the outer surface of the body 32. Interposed between the body 32 and the wall 100 is the washer 40. The washer 40 functions as a shim, to shift the body 32 away from the wall 100 until the sphere 20 resting against the body 32 is translated away from both the wall 100 and from the rod 12 bearing against the backside of the wall 100, so that the cord 14 is placed in tension. The handle 24 permits the cord 14 to be manually tensioned, to facilitate the installation of the washer 40. The residual tension, existing after the release of the handle 24, results in frictional forces between the wall 102 and the rod 12, washer 40 and/or body 32, which forces tend to maintain the position of the body 32 in opposition to applied loads. Preferably, the washer 40 is provided with a slot 41, so that the washer 40 can be placed about and removed from the cord 14 without first removing the body 32. With the cord 14 fully tensioned, by shimming if necessary, the nail 42 is driven through the body aperture 34 and into the wall 100, to prevent rotation of the body 32 which could, in conjunction with a gravitational load, release the cord 14 from the slot 36. Thus the nail 42 secures the attachment apparatus 10 in place. After installation, the cord 14 can be trimmed at a location immediately adjacent the sphere 20 in contact with the body 32. To provide minimal visual interruption of the wall when the attachment apparatus 10 is installed thereon, the cord 14, the hook 30 and the washer 40 are each preferably fabricated from a transparent nylon, or plastic, material.

Referring then to FIG. 6, an alternate embodiment of the hook apparatus is shown generally by reference number 130. The hook 130 is functionally compatible with the rod 12 and the cord 14 of the attachment apparatus 10 of FIG. 1. The hook 130 is provided with a body 132 which defines an aperture 134 and a slot 136. The body 132 has a curved lower portion which forms a saddle 138, in which loads can be cradled.

Referring also to FIG. 7, a sectional view of the hook 130 of the attachment apparatus 10 is shown installed against a wall 100. The body 132 defines two functional inclined, or ramp, surfaces. A tension ramp surface 140 is located about both sides of the slot 136, so that as the hook 130 is slid downwardly about a link 22 of the cord 14, the sphere 20 which is contacted is displaced by the ramp surface 140, until the sphere 20 reaches an edge 142. A further downward translation of the hook 130 permits the sphere 20 to travel over the edge 142 and down a locking ramp 144, thereby relieving a portion of the tension in the cord 14. Since downward or gravitational loads applied to the saddle 138 tend to further bottom the link 22 in the slot 136, and the locking ramp 144 of the body 132 requires that the tension of the cord 14 be increased to permit the sphere 20 to travel over the edge 142, a particularly stable configuration of the attachment apparatus 10 is provided by the hook apparatus 130.

While the invention has been particularly shown and described with reference to preferred embodiments thereof, it will be understood by those skilled in the art that the foregoing and other changes in form and details may be made therein without departing from the spirit and scope of the invention.

I claim:

1. A wall attachment apparatus, comprising: backing means having an elongated rod member for contacting a first face of said wall; hook means for contacting a second face of said wall and further for permitting support of a load; tension means connected to said elongated rod member at a place spaced from the ends thereof for biasing said wall between said backing means and said hook means; and said tension means comprising a convoluted cord member; said cord having at least a pivotally flexible coupling to said rod member; and said hook means having means for engaging a particular one of said convolutions.

2. An attachment apparatus in accord with claim 1 further comprising piercing means for driving said rod member through said wall.

3. An attachment apparatus in accord with claim 2 wherein said piercing means comprising:
   said rod member having a first pointed end and an opposed second end; and
   said rod member further having collumnarity so that impact applied to said second end can drive said pointed end into said wall.

4. An attachment apparatus in accord with claim 1 wherein said tension means comprising:
   said hook means having fork means for engaging a particular one of said convolutions.

5. An attachment apparatus in accord with claim 4 wherein said tension means further comprising:
   said cord having a series of spheres and a corresponding series of links coupling said spheres; and
   said fork means comprising a body member having at least an aperture and a slot open to said aperture so that said cord can pass freely through said aperture and further so that said slot can be slid about one of said links to secure said body against one of said spheres at a location along said cord.

6. An attachment apparatus in accord with claim 5 wherein said fork means further comprising said body member having a wall contact surface lying perpendicular to said aperture and said slot and further having at least a first ramp surface opposed to said wall contact surface and angularly disposed with respect to said wall contact surface so that as said slot is slid about said one of said links said ramp surface contacts said one of said spheres to tension said cord.

7. An attachment apparatus in accord with claim 5 wherein said tension means further comprising shim means having at least a slotted washer for permitting said body member to be shimmed from said second face to tension said cord when said second aperture is slid about one of said links.

8. An attachment apparatus in accord with claim 5 wherein said cord and said body member each having transparency.

9. An attachment apparatus in accord with claim 3 wherein said piercing means further comprising:
   said rod member having a medial pivotal coupling to said cord;
   said rod member further having a channel running from said pivotal coupling to said second end so that said cord can lie in said channel when said rod member is driven through said wall.

10. An attachment apparatus in accord with claim 9 wherein said piercing means further comprising driver rod means for permitting said rod member to be driven completely through said wall.

11. An attachment apparatus in accord with claim 4 wherein said tension means further comprising handle means coupled at a second end of said cord for permitting a manual tensioning of said cord to facilitate installation of said fork means.

12. A method of suspending a load from a wall, comprising the steps of:
   coupling a periodically convoluted cord to a rod;
   driving said rod completely through said wall;
   tensioning said cord to load said rod against said wall;
   forking a convolution of said convoluted cord with a slotted hook; and
   engaging said load upon said hook.

* * * * *